(12) United States Patent
Tawara et al.

(10) Patent No.: US 6,267,657 B1
(45) Date of Patent: Jul. 31, 2001

(54) GRINDING SWARF COLLECTOR

(75) Inventors: Satoshi Tawara, Takasago; Hiroshi Yasukura, Kobe; Yasuhiro Kanai, Takasago, all of (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/426,182

(22) Filed: Oct. 25, 1999

(51) Int. Cl.[7] .................................................. B24B 55/06
(52) U.S. Cl. .......................................... 451/456; 125/13.01
(58) Field of Search ..................................... 451/456, 449, 451/453, 454; 125/13.01

(56) References Cited

U.S. PATENT DOCUMENTS

| | | |
|---|---|---|
| 1,681,506 | 8/1928 | Spurlin . |
| 2,394,556 * | 2/1946 | Martin .................................. 451/456 |
| 4,151,705 * | 5/1979 | Evans .................................... 451/456 |

FOREIGN PATENT DOCUMENTS

| | | | |
|---|---|---|---|
| 274514 * | 5/1914 | (DE) | ..................................... 451/456 |
| 1683743A | 2/1971 | (DE) . | |
| 0865867A1 | 9/1998 | (EP) . | |
| 848564 * | 9/1960 | (GB) | ..................................... 451/456 |
| 61-114083 | 5/1986 | (JP) . | |
| 513842 * | 5/1976 | (SU) | ..................................... 451/456 |

* cited by examiner

*Primary Examiner*—Robert A. Rose

(57) ABSTRACT

A grinding swarf collector is disclosed. An outer periphery and side surfaces of a grinding wheel, except a site of grinding including a grinding point, are covered with a cover. A dust collecting plate is disposed behind the grinding point in a direction of rotation of the grinding wheel. Swarf scattered rearward collides with the dust collecting plate, and is scooped up thereby toward a suction port. The suction port sucks the swarf, which is sucked into a vacuum cleaner. Swarf scattered around the grinding wheel collides with the cover, falls to an opening formed below, and is sucked through the suction port. Thus, grinding swarf is collected efficiently.

2 Claims, 7 Drawing Sheets

GRINDING SWARF COLLECTOR

BACKGROUND OF THE INVENTION

1. Field of the Invention

The present invention relates to a grinding swarf collector designed to satisfactorily collect swarf discharged during grinding of an internal surface of piping.

2. Description of the Related Art

An example of a conventional grinding swarf collector is shown in FIG. 7. This device shown in FIG. 7 is a cutter for an inner peripheral surface of a cylindrical structure, the device being disclosed in Japanese Unexamined Patent Publication No. 61-114083. Collection of swarf in this device will be described.

In FIG. 7, J denotes an induction electric furnace, 101 denotes a refractory lining of the induction electric furnace, 102 denotes an induction heating coil embedded in the refractory lining 101, and K denotes an inner peripheral surface cutter concerned with an earlier technology.

The inner peripheral surface cutter K is composed of a cover 110 for covering an upper opening 103 of the induction electric furnace J; a swivel joint 112 fixed onto the cover 110 via a bracket 111; a strut 114 having an upper end fixed to a turning-side member of the swivel joint 112, and having a lower end passing through the cover 110 and extending near a furnace bottom of the induction electric furnace J, and having a C-shaped cross section because of an axial slit 113 formed in a side wall surface thereof; a first motor M1, disposed on an upper surface of the cover 110, for imparting a rotational driving force to the strut 114 via a gear transmission mechanism 115; a screw member 117 disposed inside the strut 114 coaxially with the strut 114, having an upper end fixed to a stationary-side member of the swivel joint 112, and having a lower end borne by a lower end portion of the strut 114 via a bearing 116; a nut member 118 screwed to the screw member 117; an arm member 119 inserted slidably into the slit 113, having a base end portion secured to the nut member 118, and having a front end portion protruding from the strut 114; a gear-like rotary cutting tool 120 attached rotatably to a front end of the arm member 119; and a second motor M2, disposed on the arm member 119, for imparting a rotational driving force to the rotary cutting tool 120 via a gear transmission mechanism 121.

A cutting operation for an inner peripheral surface of a cylindrical structure by the so constituted inner peripheral surface cutter, i.e., a cutting operation for the refractory lining 101 as the inner peripheral surface of the induction electric furnace J, will be described below. In an initial state, the nut member 118 is situated at the uppermost end of the screw member 117.

As shown in FIG. 7, the strut 114 is inserted into the induction electric furnace J. The upper opening 103 of the induction electric furnace J is covered with the cover 110 whose position is adjusted so that the strut 114 is located at the center of the induction electric furnace J. In this state, the second motor M2 is rotated in a predetermined direction. A rotational driving force of the motor M2 is transmitted to the rotary cutting tool 120 via the gear transmission mechanism 121, whereupon the rotary cutting tool 120 begins to make a rotation about its own axis. Furthermore, the first motor M1 is rotated in a predetermined direction. A rotational driving force of the motor M1 is transmitted to the strut 114 via the gear transmission mechanism 115, whereupon the strut 114 rotates. A rotation motion of the strut 114 is transmitted to the nut member 118 via the arm member 119 which is slidable relative to the slit 113. The nut member 118 rotates while being screwed on the screw member 117. Thus, the nut member 118 descends along an axial direction of the screw member 117 integrally with the arm member 119. Hence, the rotary cutting tool 120 rotates on its own axis at the front end of the arm member 119, and also makes a rotation about the strut 114, with the arm member 119 defining a turning radius. Furthermore, the rotary cutting tool 120 descends along an axial direction of the strut 114. Thus, the rotary cutting tool 120 descends, while making a spiral movement, along the inner peripheral surface of the induction electric furnace J to cut the entire inner peripheral surface of the refractory lining 101 of the induction electric furnace J, where an erosion or the like has occurred, to a desired depth. A large amount of dust or the like, which occurs during this process, is prevented from scattering to the outside of the induction electric furnace J, since the upper opening 103 of the induction electric furnace J is covered with the cover 110.

Besides, the inner peripheral surface cutter K for a cylindrical structure related to the earlier invention is constituted as follows: An opening 130 is formed at a lower end of the strut 114. Piping 131 leading to an external dust collector is connected to the stationary-side member of the swivel joint 112 to make the strut 114 serve as an intake pipe 114'. Further, an opening 132 is formed in the cover 110, and piping 133 leading to the above dust collector is connected to this opening 132 as well. Under the action of the intake pipe 114' and the pipings 131, 133, large amounts of swarf and dust, which have occurred in the induction electric furnace J during the cutting operation for the refractory lining 101, are sucked and discharged to the outside, and treated by the dust collector, etc.

According to the conventional swarf collection technique described above, swarf falling by the action of gravity is sucked and collected. If a cylinder to the processed is placed in a horizontal position or at an angle close to the horizontal, swarf does not reach suction ports, and cannot be collected. The device according to the earlier invention, moreover, is directed at processing a large structure with an internal diameter of 5 meters or more, such as an inner wall of an electric furnace. Thus, it has been unable to collect swarf in a bottlenecked portion with a piping internal diameter of about 10 cm.

SUMMARY OF THE INVENTION

The present invention has been accomplished in view of the above-described problems with the earlier technology. It is an object of the invention to provide a grinding swarf collector capable of collecting swarf efficiently while preventing its scattering.

To attain the above object, an aspect of the present invention is a grinding swarf collector, comprising:

a cover for covering an outer peripheral surface and side surfaces of a grinding wheel, except a site of grinding by the grinding wheel;

a suction mechanism, located behind a grinding point in a direction of rotation of the grinding wheel, for sucking swarf; and a dust collecting plate, located behind the grinding point in the direction of rotation of the grinding wheel, for guiding scattered swarf to the suction mechanism.

According to this aspect of the invention, swarf scattered rearward of the grinding point is scooped up with the dust collecting plate, and sucked into the suction mechanism.

Swarf scattered around the grinding wheel collides with the cover, falls to an opening of the cover (the site of grinding), and is then sucked in to the suction mechanism. In this manner, swarf can be collected reliably.

Another aspect of the present invention is a grinding swarf collector, comprising:

a cover for covering an outer peripheral surface and side surfaces of a grinding wheel, except a site of grinding by the grinding wheel;

a suction mechanism, located behind a grinding point in a direction of rotation of the grinding wheel, for sucking swarf;

a dust collecting plate, located behind the grinding point in the direction of rotation of the grinding wheel, for guiding scattered swarf to the suction mechanism; and an air blowing mechanism for blowing air toward the suction mechanism, with the grinding point being interposed between the air blowing mechanism and the suction mechanism.

According to this aspect of the invention, swarf scattered rearward of the grinding point is scooped up with the dust collecting plate, and sucked into the suction mechanism. Swarf scattered around the grinding wheel collides with the cover, falls to an opening of the cover (the site of grinding), and is then sucked into the suction mechanism. In this manner, swarf can be collected reliably. Furthermore, air is blown at the grinding point, thereby promoting the dissipation of heat generated by grinding. This is also effective for preventing the high heat-associated deterioration of an object to be ground, and the destruction of the grinder due to high heat.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

PREFERRED EMBODIMENTS OF THE INVENTION

A grinding swarf collector according to the present invention will now be described in detail by way of the following embodiments with reference to the accompanying drawings, but it should be understood that the invention is not restricted thereby.

Figure 1:
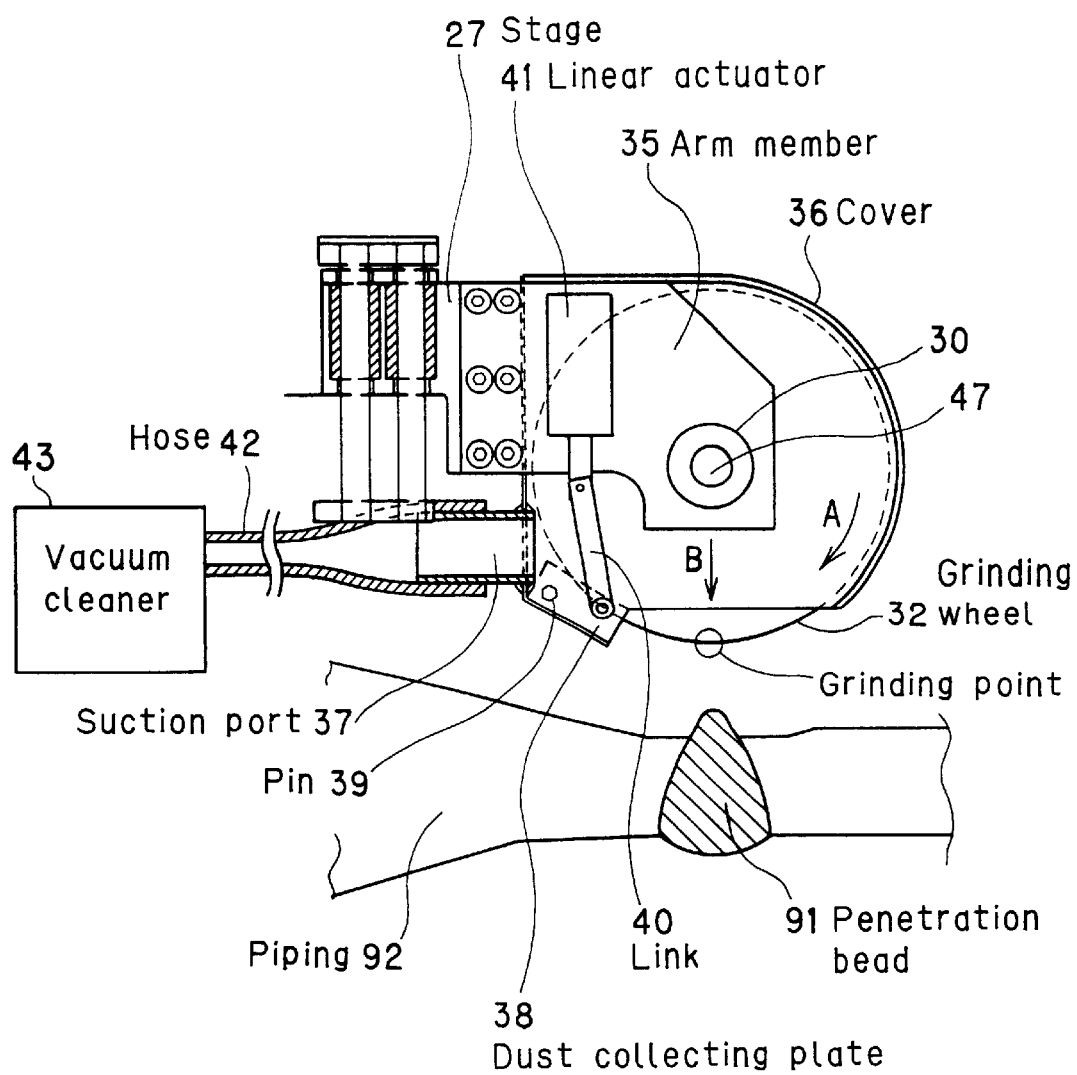
FIG. 1 is a side view of a grinding swarf collector according to a first embodiment of the present invention.
Figure 2:
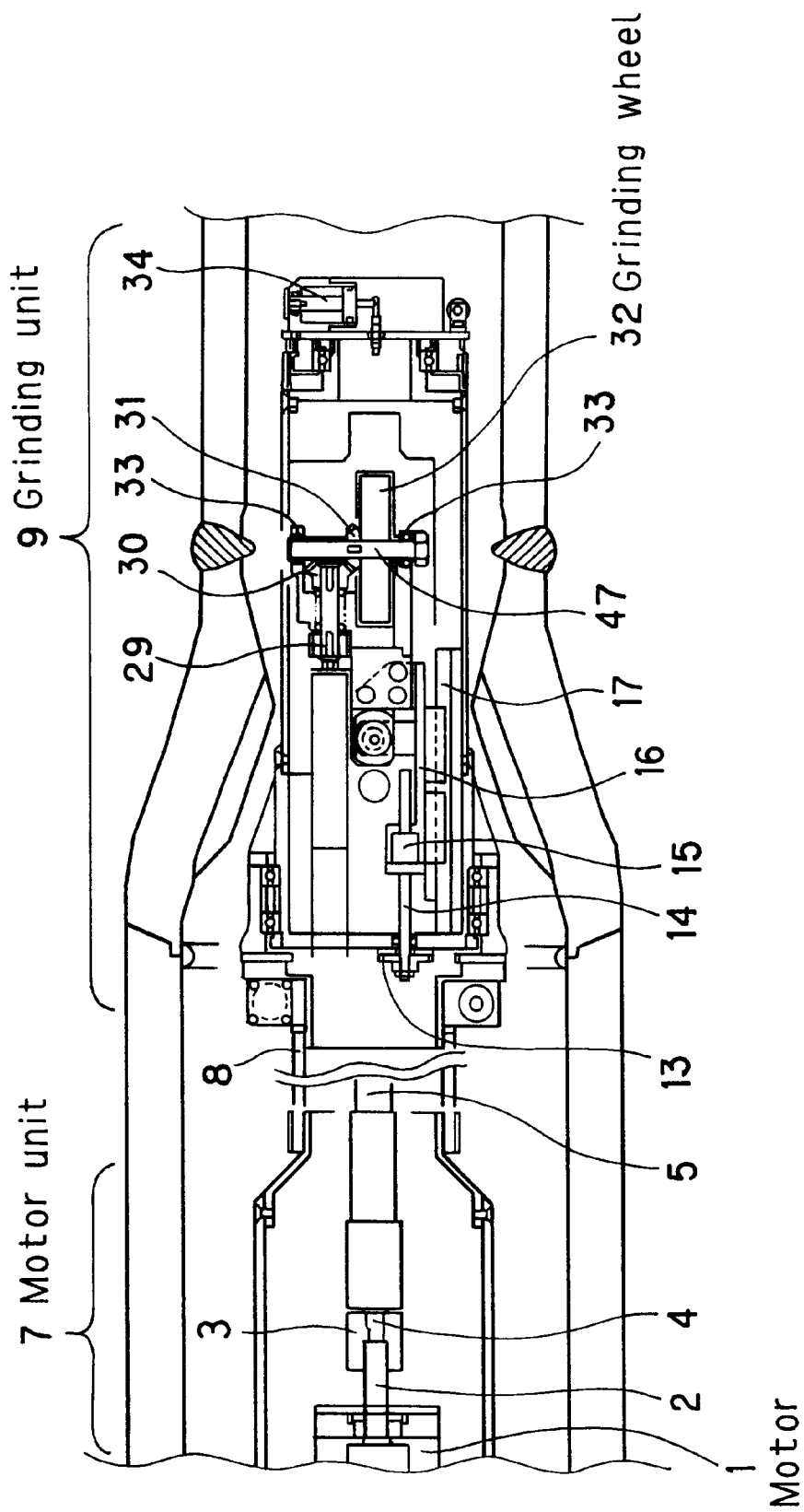
FIG. 2 is a sectional plan view of a pipe inner surface grinder equipped with the grinding swarf collector according to the first embodiment of the present invention.
Figure 3:
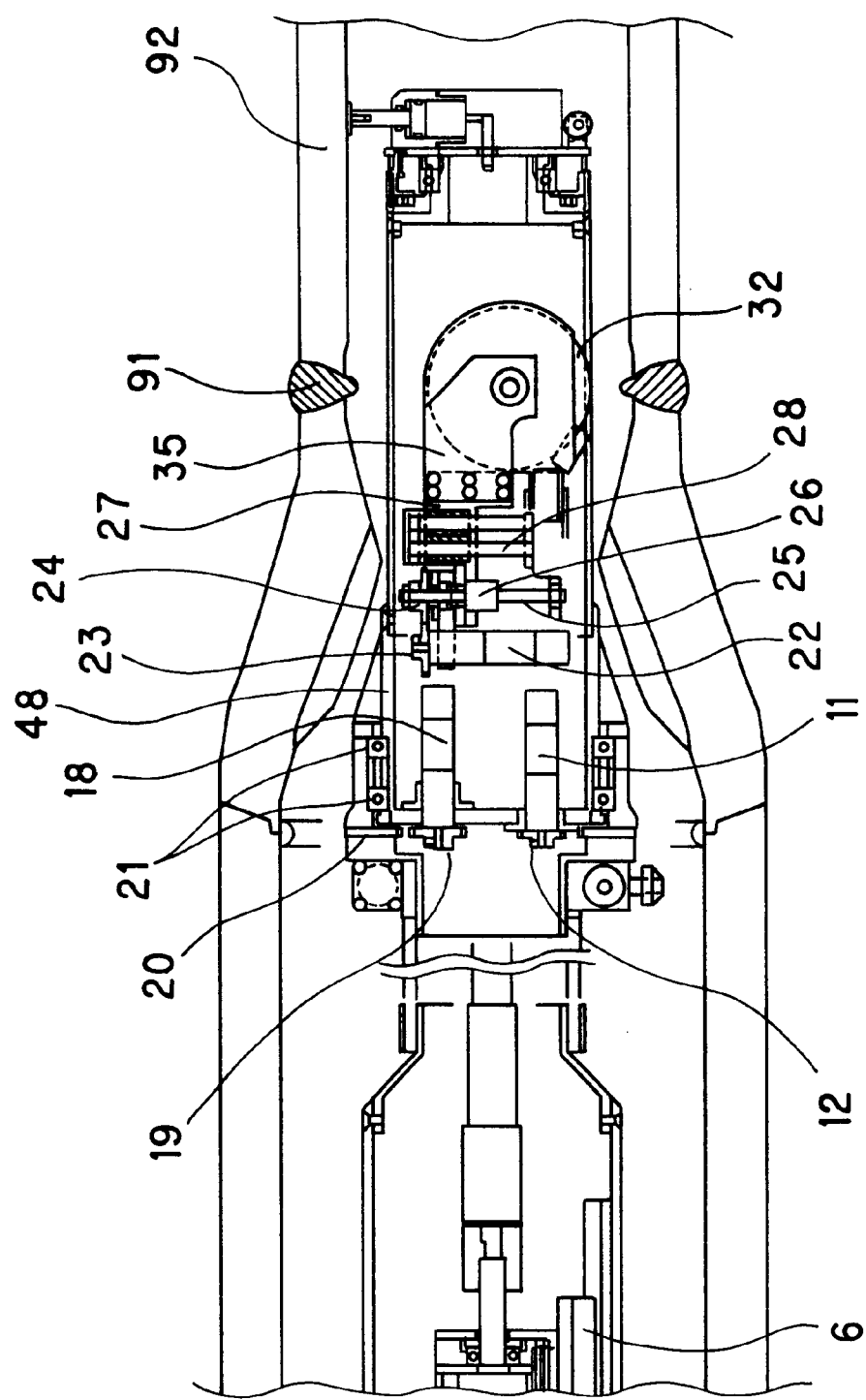
FIG. 3 is a sectional side view of the pipe inner surface grinder equipped with the grinding swarf collector according to the first embodiment of the present invention.

FIGS. 1 to 3 are constitution drawings of a piping inner surface grinder for grinding a weld bead, called a penetration bead, at the weld of piping of a plant, the grinder to which a grinding swarf collector according to a first embodiment of the present invention has been applied. FIG. 1 is a side view of a grinding swarf collector portion according to the invention in the piping inner surface grinder. FIG. 2 is a sectional plan view of the grinder. FIG. 3 is a sectional side view of the grinder.

First, the constitution of the piping inner surface grinder will be described with reference to FIGS. 2 and 3. The piping inner surface grinder is composed roughly of two units, a grinding unit 9 and a motor unit 7. The grinding unit 9 has the function of fixing the grinding unit 9 in piping, the function of positioning a grinding wheel, and the function of collecting swarf related to the present invention. The motor unit 7 houses a motor 1 for driving a grinding wheel 32. The grinding unit 9 and the motor unit 7 are connected together by a coil spring 8.

Inside the motor unit 7, the motor 1 is fixed onto a stage of a linear guide 6 which is slidable in an axial direction of the piping. An output shaft 2 of the motor 1 is connected to an inner shaft 4 of a torque tube 5 via a joint 3. To the other end 29 of the inner shaft of the torque tube 5, a bevel gear 30 is fixed. Engagement between this bevel gear 30 and a bevel gear 31 fixed to the grinding wheel 32 results in the transmission of a rotational force of the motor 1 to the grinding wheel 32. A shaft 47 has both end portions supported by arm members 35 via bearings 33.

The direction and location of the grinding wheel 32 are determined by positional control on a total of three axes, i.e., an axis in a radial direction of the piping (R axis), an axis in an axial direction of the piping (Z axis), and an axis in a circumferential direction of the piping (θ axis), so that a penetration bead 91 on an inner periphery of the piping will be ground on the entire periphery to the same inner diameter as that of piping 92.

A positional control mechanism for the R axis is composed of an encoder-equipped geared motor 22, spur gears 23, 24, a ball screw 25, a nut 26, and a linear guide 28. Rotation of the motor 22 is transmitted to the ball screw 25 via the set of spur gears 23, 24, and the movement of a stage 27 to which the nut 26 is attached becomes a motion on the R axis.

The degree of freedom of the movement of the stage 27, except a linear motion on the R axis, is restrained by the linear guide 28.

A positional control mechanism for the Z axis, like that for the R axis, is composed of an encoder-equipped geared motor 11, spur gears 12, 13, a ball screw 14, a nut 15, and a linear guide 17. Rotation of the motor 11 is transmitted to the ball screw 14 via the set of spur gears 12, 13, and the movement of a stage 16 to which the nut 15 is attached becomes a motion on the Z axis. The degree of freedom of the movement of the stage 16, except a linear motion on the Z axis, is restrained by the linear guide 17.

A positional control mechanism for the θ axis is composed of an encoder-equipped geared motor 18, a spur gear 19, an internal gear 20, and a ball bearing 21. Rotation of the motor 18 is transmitted to the internal gear 20 via the spur gear 19, and the movement of a stage 48 to which the internal gear 20 is attached becomes a motion on the θ axis. The degree of freedom of the movement of the stage 48, except a rotary motion on the θ axis, is restrained by the ball bearing 21.

The grinding swarf collector according to the first embodiment, as shown in FIG. 1, is composed mainly of a cover 36, a suction port 37, a dust collecting plate 38, a linear actuator 41, a hose 42, and a vacuum cleaner 43.

The cover 36 is fixed to the arm member 35, and covers a site of the grinding wheel 32, which is out of contact with an object to be ground, with a 0.5 mm thick stainless steel plate. That is, the cover 36 is so disposed as to cover an outer peripheral surface and side surfaces of the grinding wheel 32, except a site of grinding by the grinding wheel 32. Besides, the clearance between the cover 36 and the grinding wheel 32 is set at as small as 5 mm or less.

On side surfaces of the cover 36 located behind a grinding point in the direction of rotation of the grinding wheel 32, the suction port 37 shaped like a pipe is installed on the cover 36 for sucking out swarf. The suction port 37 is connected to the vacuum cleaner 43 via the hose 42 of nylon.

To the cover 36 below the suction port 37, the dust collecting plate 38 supported by a pin 39 is attached. The dust collecting plate 38 is adapted to freely rotate about the pin 39, to be moved up and down by the linear actuator 41 connected thereto via a link 40, and to be fixed at an arbitrary position. The dust collecting plate 38 is disposed behind the grinding point in the direction of rotation of the grinding wheel 32.

Figure 4:
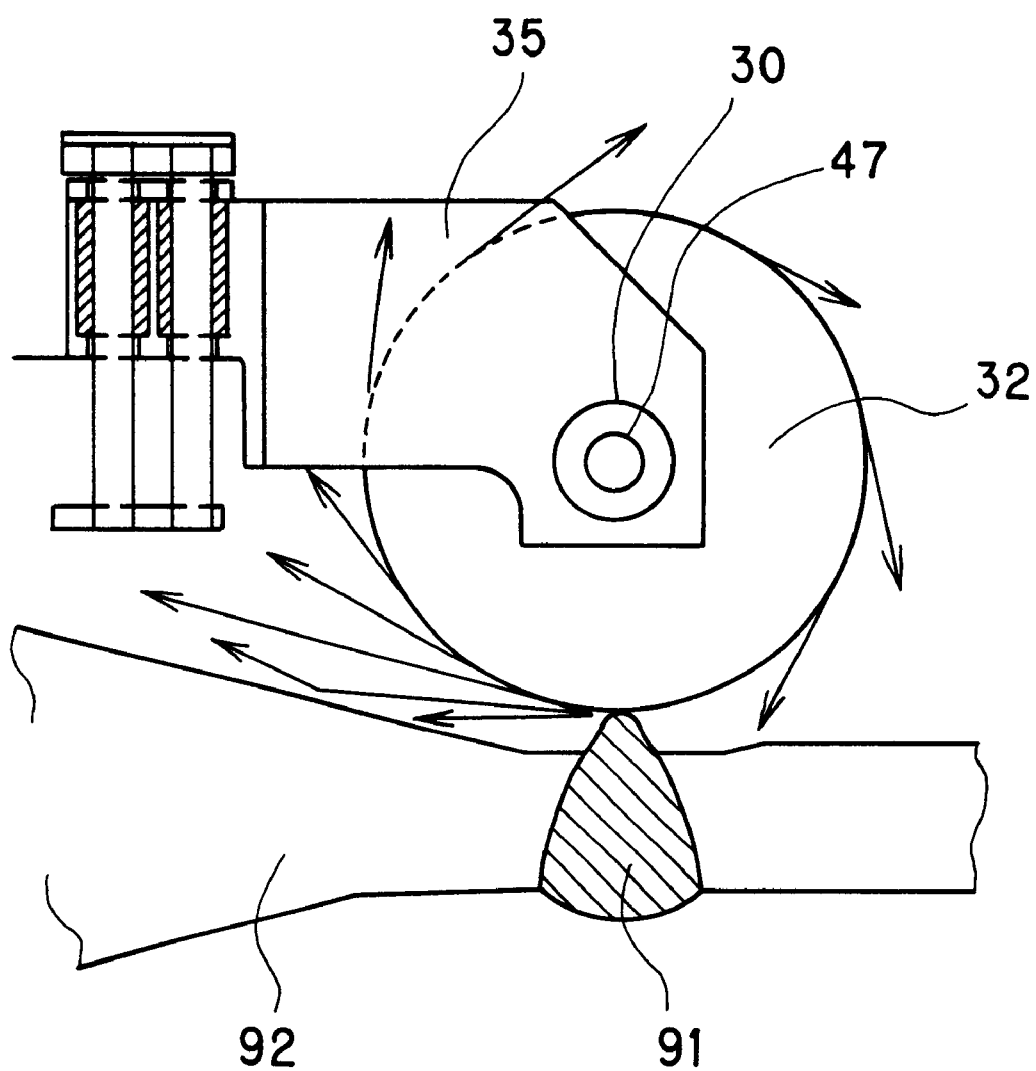
FIG. 4 is an explanation drawing showing a state in which the grinding swarf collector is absent.
Figure 5:
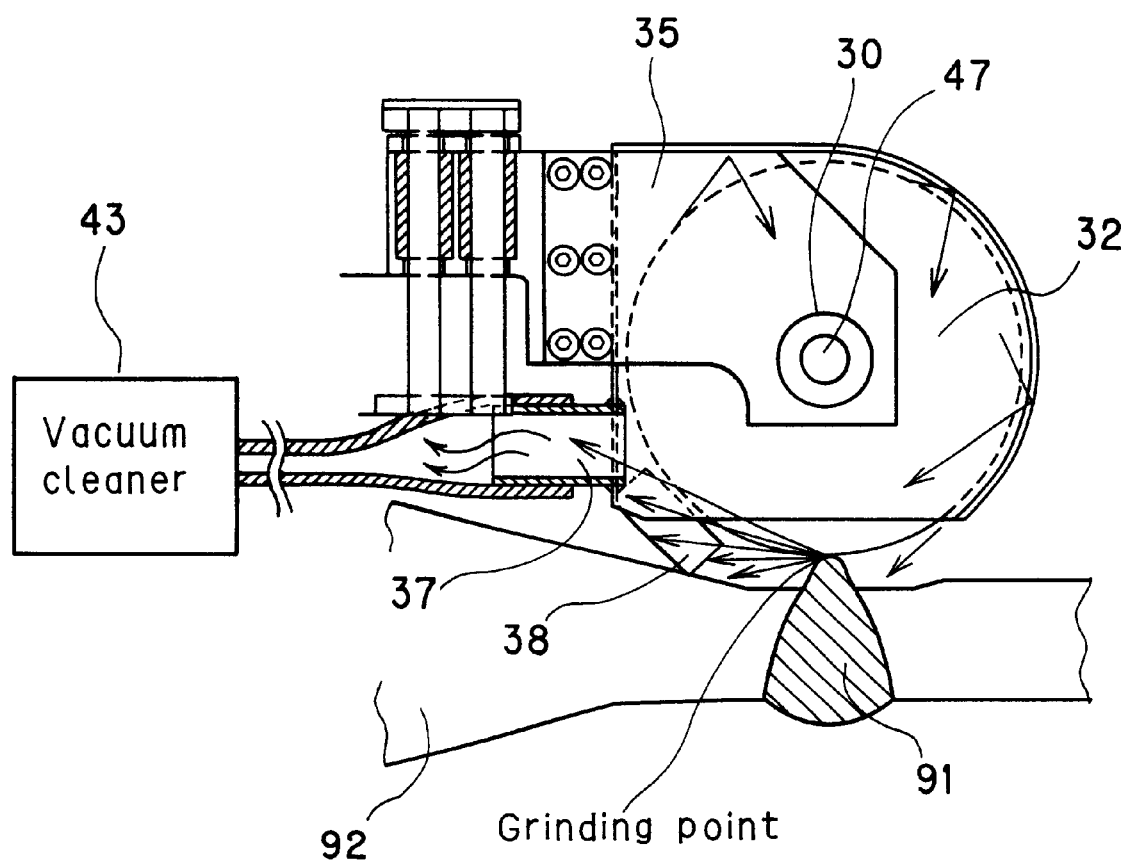
FIG. 5 is an explanation drawing showing a state of action of the grinding swarf collector according to the first embodiment of the present invention.

The actions of the grinding swarf collector according to the first embodiment will be described based on FIG. 1. Upon rotation of the motor 1 of the motor unit 7, the grinding wheel 32 rotates in a direction of an arrow A. In this state, the stage 27 on the R axis moves in a direction of an arrow B to press the grinding wheel 32 against the penetration bead 91, an object to be ground, thereby performing grinding. If the presently claimed device is not installed on this occasion, swarf will scatter off in all directions, as shown in FIG. 4. By installing the present device, swarf scattering rearward of the grinding point is scooped up with the dust collecting plate 38, as shown in FIG. 5. Then, the swarf is sucked into the vacuum cleaner 43 through the suction port 37. Swarf scattered around the grinding wheel, on the other hand, collides with the cover 36, and falls through an opening of the cover 36. By these actions, scatter of swarf can be prevented, and swarf can be collected efficiently.

Figure 6:
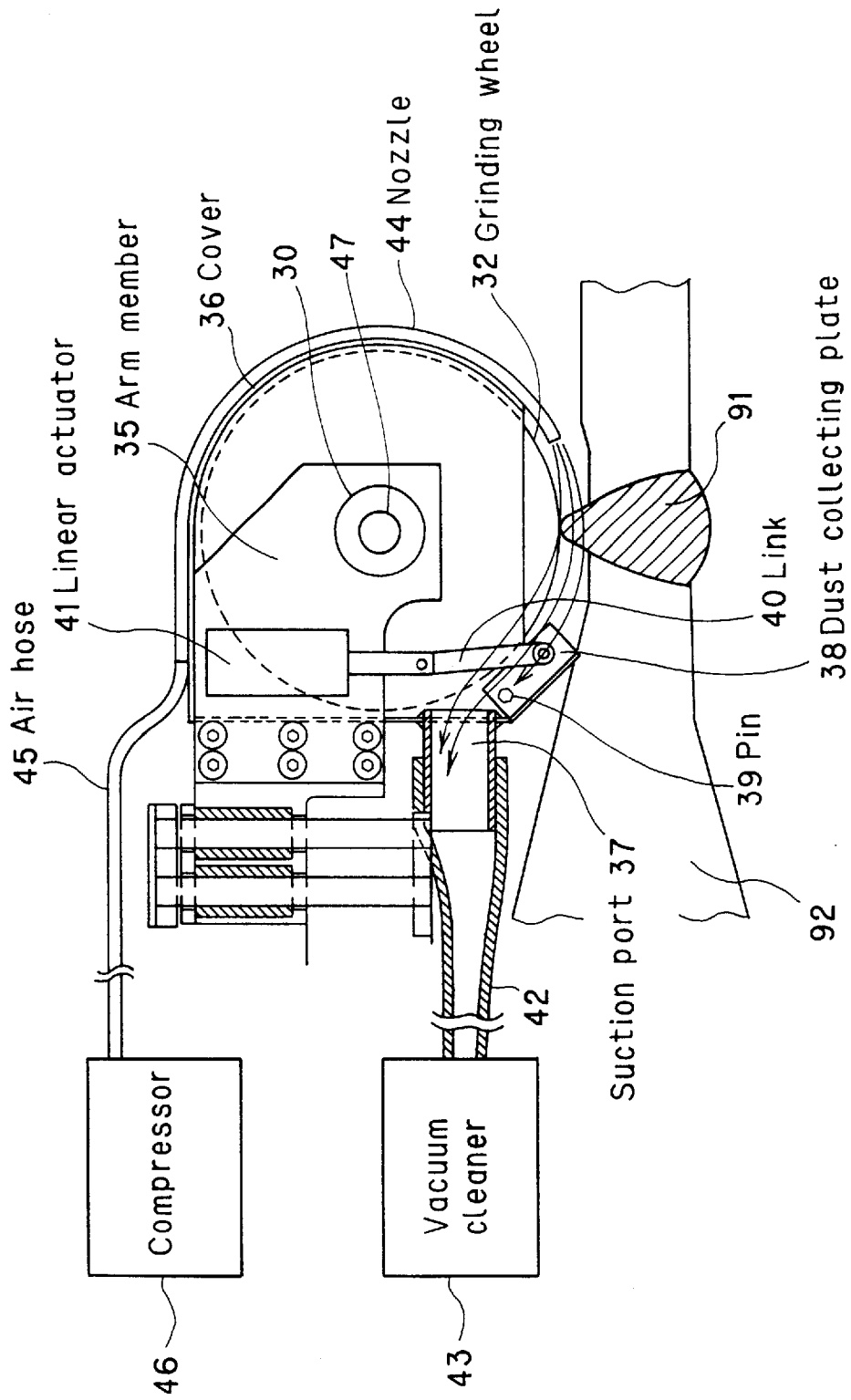
FIG. 6 is a side view of a grinding swarf collector according to a second embodiment of the present invention.
Figure 7:
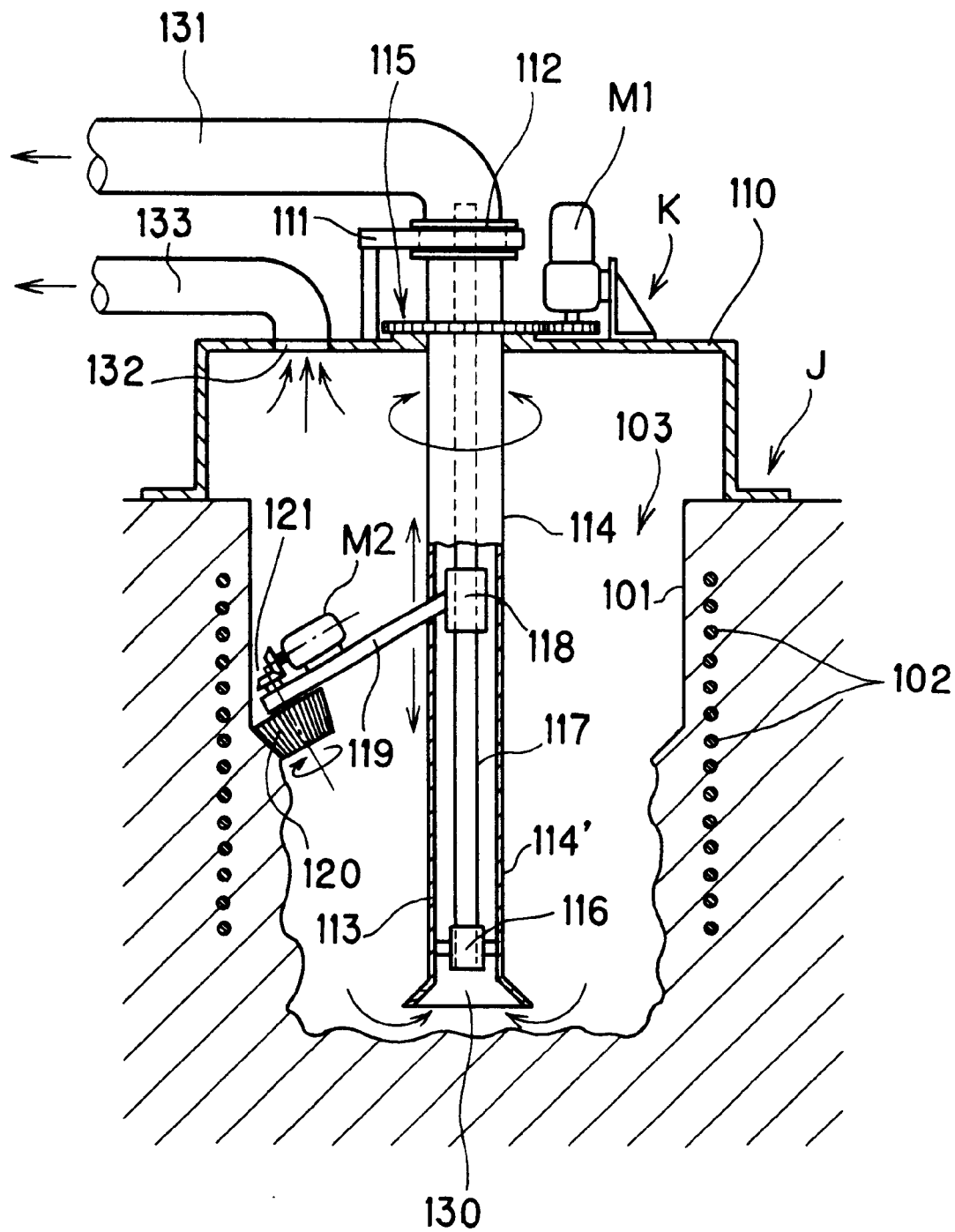
FIG. 7 is a constitution drawing of an inner peripheral surface cutter for a cylindrical structure according to an earlier technology.

FIG. 6 shows a grinding swarf collector as a second embodiment which differs from the first embodiment in the respects stated below. This embodiment concerns a grinding swarf collector having a structure for blowing air toward a grinding point from forward of the grinding point.

The swarf collector is composed mainly of a cover 36, a suction port 37, a dust collecting plate 38, a linear actuator 41, a hose 42, a vacuum cleaner 43, a nozzle 44, an air hose 45, and a compressor 46, as shown in FIG. 1. The cover 36 is fixed to arm members 35, and covers a site of a grinding wheel 32, which is out of contact with an object to be ground, with a 0.5 mm thick stainless steel plate. On side surfaces of the cover 36 located behind the grinding point, the suction port 37 shaped like a pipe is installed on the cover 36 for sucking out swarf. The suction port 37 is connected to the vacuum cleaner 43 via the hose 42 of nylon. To the cover 36 below the suction port 37, the dust collecting plate 38 supported by a pin 39 is attached. The dust collecting plate 38 is adapted to freely rotate about the pin 39, to be moved up and down by the linear actuator 41 connected thereto via a link 40, and to be fixed at an arbitrary position. The nozzle 44 for blowing air toward the suction port 37 is disposed on the outer periphery of the cover 36, with a grinding point being interposed between the nozzle 44 and the suction port 37. The nozzle 44 is connected via the air hose 45 to the compressor 46 installed outside.

The second embodiment gives not only the effects of the first embodiment, but also the effect of the nozzle 44 for blowing air toward the suction port 37, with the grinding point being interposed between the nozzle 44 and the suction port 37. That is, the nozzle 44 generates a flow of air as indicated by arrows in FIG. 6. Thus, swarf is blown away and introduced into the suction port 37. Consequently, swarf can be collected efficiently in comparison with the first embodiment. Furthermore, air is blown at the grinding point, thereby promoting the dissipation of heat generated by grinding. This is also effective for preventing the high heat-associated deterioration of the object to be ground, and the destruction of the grinder due to high heat.

This invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A grinding swarf collector for grinding an irregular surface of an object, comprising:

a cover for covering an outer peripheral surface and side surfaces of a grinding wheel, except for a site of grinding by the grinding wheel;

a suction mechanism, located behind a grinding point on the irregular surface in a direction of rotation of the grinding wheel, for sucking swarf;

a dust collecting plate, located behind the grinding point in the direction of rotation of the grinding wheel, for guiding scattered swarf to the suction mechanism;

a linear actuator for positioning the dust collecting plate against said irregular surface adjacent the grinding point; and an air blowing mechanism for blowing air toward the suction mechanism, with the grinding point being interposed between the air blowing mechanism and the suction mechanism;

said air blowing mechanism including a compressor and a tube extending around the grinding wheel, a first end of the tube being connected in fluid communication with the compressor and a second end of the tube forming a nozzle for directing air toward the grinding point and dust collecting plate.

2. The grinding swarf collector of claim 1, wherein said dust collecting plate is fully rotatable.

* * * * *